United States Patent
Omura

[11] 3,765,661
[45] Oct. 16, 1973

[54] CUTTING TORCH DEVICE FOR GAS CUTTING

[75] Inventor: Yoshiaki Omura, Tamano, Japan
[73] Assignee: Mitsui Shipbuilding and Engineering Co., Ltd., Tokyo, Japan
[22] Filed: Sept. 9, 1971
[21] Appl. No.: 178,896

[52] U.S. Cl.............................. 266/23 L, 266/23 R
[51] Int. Cl................................................ B23k 7/10
[58] Field of Search.............. 266/23 R, 23 F, 23 K, 266/23 L, 23 M, 23 N

[56] References Cited
UNITED STATES PATENTS
1,152,985  9/1915  Smith................................ 266/23 K
2,185,781  1/1940  Becker.............................. 266/23 K
2,886,305  5/1959  Strahan............................ 266/23 K

*Primary Examiner*—Gerald A. Dost
*Attorney*—Howson and Howson

[57] ABSTRACT

A cutting torch device for gas cutting used for cutting a steel plate having mechanism for cutting a starting hole through the steel plate, the starting-hole mechanism comprising a nozzle provided to move along the cutting direction, and means for pivotally moving the nozzle by pressure of cutting oxygen supplied to the nozzle.

3 Claims, 3 Drawing Figures

Patented Oct. 16, 1973 3,765,661
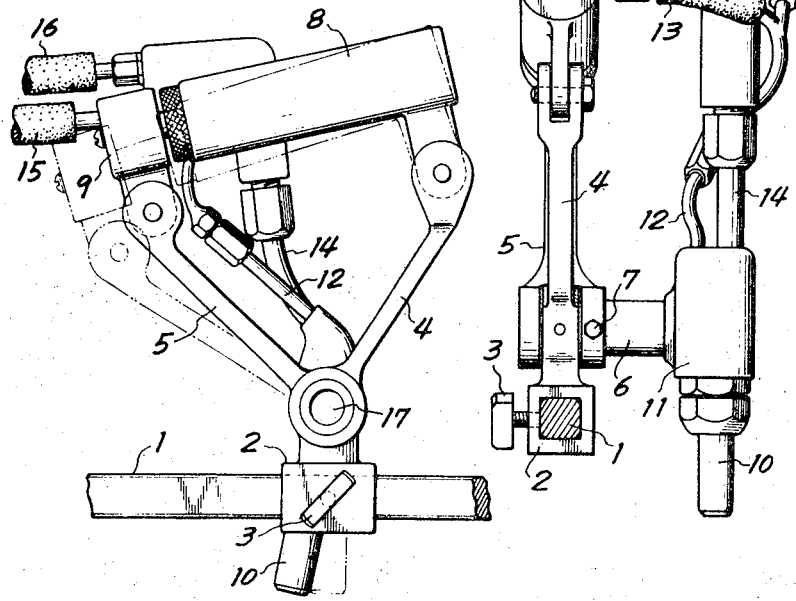
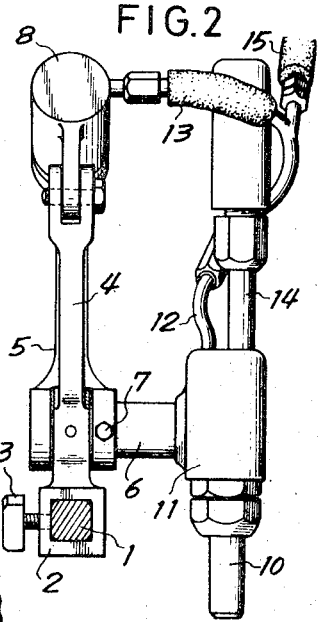
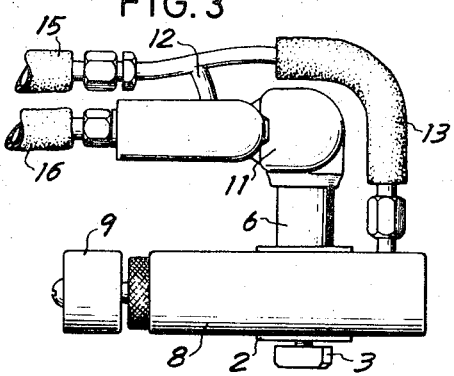

CUTTING TORCH DEVICE FOR GAS CUTTING

This invention relates to a cutting torch device for gas cutting.

When cutting a steel plate from an inside point, a hole is cut through the plate at the point for starting the gas cutting. The hole is normally cut by gas cutting or drill. In the case of gas cutting, rebounded melted metal causes damage to the nozzle of the cutting torch and, in addition, the hole becomes large diameter so that, when the hole is near the edge of the steel plate, the steel plate would be broken at the edge, or fine cutting face can not be obtained.

Therefore, it is an object of the present invention to provide a cutting torch which may cut a relatively small starting hole and the nozzle is not damaged.

In order to prevent the damage owing to the rebound of melted metal, in accordance with the present invention, the nozzle is pivotally moved according to flow rate of cutting oxygen which blows away the melted metal.

In the drawings:

FIG. 1 is a front view of a cutting torch in accordance with the present invention;

FIG. 2 is a side elevational view of the cutting torch; and

FIG. 3 is a plan view of the cutting torch.

Referring to the drawings, the device in accordance with the present invention is slidably supported on the rod 1 of the gas cutting machine by the ring 2 and fixed by the screw 3. The ring 2 has an arm 4 and a shaft 17 secured thereto. On the shaft 17 rotatably mounted a pipe 6 on which an arm 5 and a torch 11 having a nozzle 10 are secured. A cylinder 8 is rotatably supported on the arm 4 at the end thereof and the piston rod 9 is connected to the arm 5 by a pin. A pipe 15 connected to oxygen source is divided into pipes 12 and 13, the pipe 12 being connected to the torch 11 and the pipe 13 being connected to the cylinder 8. A pipe 16 from gas source is connected to the torch 11 by the pipe 14.

In operation, before starting the torch is in the solid line position of FIG. 1 and the nozzle 10 is located near the starting point of the steel plate. The steel plate is heated by heating gas flame so as to be melted at the starting point. A valve (not shown) to regulate the cutting oxygen is gradually opened thereby the melted metal is burned and blown away. At the same time, the piston rod 9 is projected little by little by pressure of the cutting oxygen, so that the arm 5 and nozzle 10 are rotated to the dotted line positions in FIG. 1. Thus an oval hole is cut in the steel plate by movement of the nozzle. When the hole has been cut through the plate, the cutting torch is advanced in order to cut the plate.

From the foregoing, it will be observed that the melted metal is easily blown away and the nozzle is not damaged by the rebound melted metal, because the nozzle is moved along the surface of the steel plate when the burning of the starting hole commences. In addition, the hole is elongated along the cutting direction with a relatively narrow width, which provides a fine cutting face.

What is claimed is:

1. A cutting torch device for gas cutting having mechanism for burning a starting hole at a point in the steel plate comprising a nozzle provided to move along the cutting direction, pivot means mounting said nozzle for rotation about an axis transverse to the axis of said nozzle, and expansible chamber means for piotally moving the nozzle having a connection to the supply of cutting oxygen to be supplied to the nozzle, whereby said nozzle is pivoted when oxygen is supplied to aid nozzle.

2. A torch device according to claim 1 including a slide rod and ring mounting said nozzle for adjustment along an axis perpendicular to said pivotal axis of said pivot means.

3. A device according to claim 2 wherein said ring has an arm and a shaft, said shaft constituting said pivot means, and said expansible chamber means comprising a cylinder and piston connected between said arm and said nozzle.

* * * * *